United States Patent [19]

Ott

[11] Patent Number: 4,639,859

[45] Date of Patent: Jan. 27, 1987

[54] PRIORITY ARBITRATION LOGIC FOR A MULTI-MASTER BUS SYSTEM

[75] Inventor: Russell G. Ott, Cranford Township, Union County, N.J.

[73] Assignee: RCA Corporation, Princeton, N.J.

[21] Appl. No.: 613,410

[22] Filed: May 24, 1984

[51] Int. Cl.[4] .......................... G06F 15/16; H04Q 9/00
[52] U.S. Cl. ..................................... 364/200; 364/900
[58] Field of Search .............................. 364/200, 900; 340/825.51

[56] References Cited

U.S. PATENT DOCUMENTS

| | | | |
|---|---|---|---|
| 4,038,644 | 7/1977 | Duke et al. | 364/900 |
| 4,366,480 | 12/1982 | Van Hatten | 340/825.51 |
| 4,373,183 | 2/1983 | Means et al. | 364/200 |
| 4,374,413 | 2/1983 | Comfort et al. | 364/200 |
| 4,375,639 | 3/1983 | Johnson, Jr. | 340/825.51 |
| 4,385,382 | 5/1983 | Goss et al. | 370/96 |
| 4,494,192 | 1/1985 | Lew et al. | 364/200 |
| 4,499,538 | 2/1985 | Finger et al. | 364/200 |

Primary Examiner—Gareth D. Shaw
Assistant Examiner—Randy Walter Lacasse
Attorney, Agent, or Firm—Joseph S. Tripoli; Robert L. Troike; Raymond E. Smiley

[57] ABSTRACT

In a system having N devices all using a common data bus (CDB), a priority resolution circuit (PRC) for determining that particular device of the N devices which shall obtain control of the CDB when a device other than the particular device is attempting to obtain control of the CDB and comprising first logic common to all of the devices. A first control bus is common to every device and has a high signal level (SL) thereon when none of the devices is attempting to obtain control of the common data bus and a low SL thereon when any of the devices is attempting to obtain control of the CDB; and a second control bus is common to every device and has a low SL thereon when none of the devices has control of the CDB and a high SL thereon when any of the devices has control of the CDB. Each of the devices, including the particular device, comprises second logic for testing the SL on the first common control bus and responsive to the high SL on the first common control bus to then test the SL on the second common control bus. The second logic of the particular device is further responsive to the low SL of second common control bus to obtain control of the CDB.

8 Claims, 4 Drawing Figures

PRIORITY ARBITRATION LOGIC FOR A MULTI-MASTER BUS SYSTEM

This invention relates generally to priority arbitration logic for a multiprocessor system employing a common data bus and more particularly to such a system in which only a single priority resolution circuit is required for all of the processors in the system.

Both parallel and serial data buses are used in multiprocessor systems as a means for transferring data from one device to another in the system. Access to the data bus to avoid contention between devices can be controlled in one of two ways. Firstly, one device on the bus can control all accesses to the bus. A second prior art method employs logic for any of several processors on the bus to gain control of the bus when its use is not being controlled by another device. The controlling device is called the current bus master.

The first prior art method listed above is most generally used because it is simpler to implement than the second and allows for efficient use of bus time. However, the advantage of the second method is that it allows a completely modular system design with the capability of adding or removing modules with little or no change to the remaining part of the system. The most difficult problem to solve when using the second type of bus access control is the arbitration of bus access requests in a way which prevents contention on the bus.

Both of the above prior art methods for priority arbitration employ a flag bit to indicate whether or not the bus is busy. Each device with the capability of becoming the bus master must be able to execute a test and set or read-modify-write operation. This type of operation is necessary in order to prevent another device from accessing the busy flag between the time when it is checked and the time when it is set.

Other prior art methods for priority arbitration require synchronization between the clocks of the devices wanting control of the bus. All devices must be capable of placing data on the bus and reading data from the bus simultaneously. When two devices want to access the bus simultaneously, each device drives the bus and reads the data back. If a device reads data which is different from the data which it placed on the bus, it knows another device also wants access to the bus and the higher priority device takes control. Implementation of this method requires considerable circuitry incorporated on each master device chip.

In accordance with one preferred embodiment of the invention there is provided a plurality of devices all contending for use of a common data bus, and a common priority resolution circuit (PRC) for determining which particular device of the plurality of devices shall obtain control of the common data bus. The PRC comprises a first common control bus having a high level signal thereon when none of the devices is attempting to obtain control of the common data bus and a low level signal thereon when any of the devices is attempting to obtain control of the common data bus. A second common control bus has a low level signal thereon when none of the devices has control of the common data bus and a high level signal thereon when one of the devices has control of the common data bus.

Figure 2:
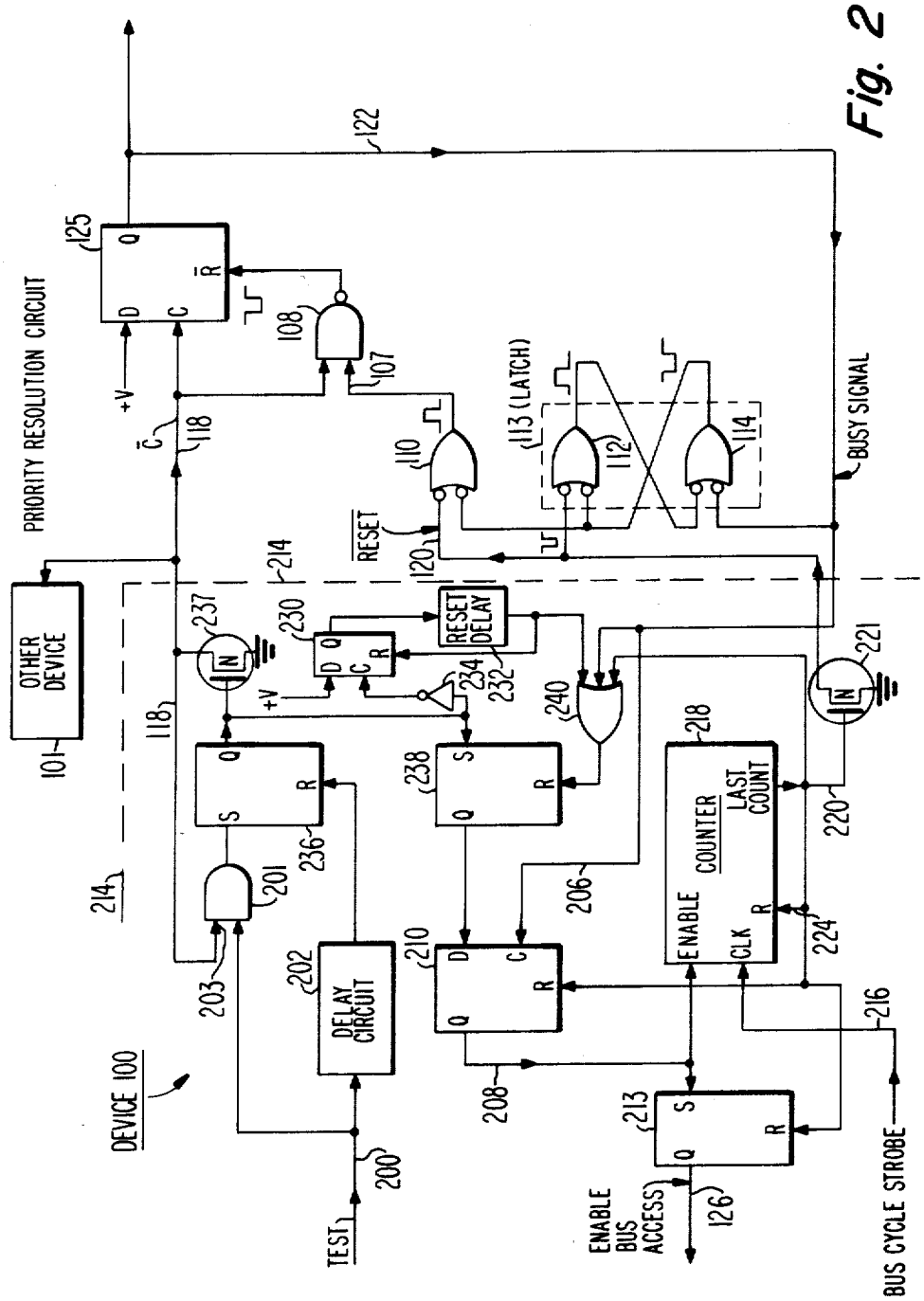
FIG. 2 is a block diagram of the priority resolution circuit and that portion of the logic of a single device which cooperates with the priority resolution circuit to determine priority resolution.
Figure 3:
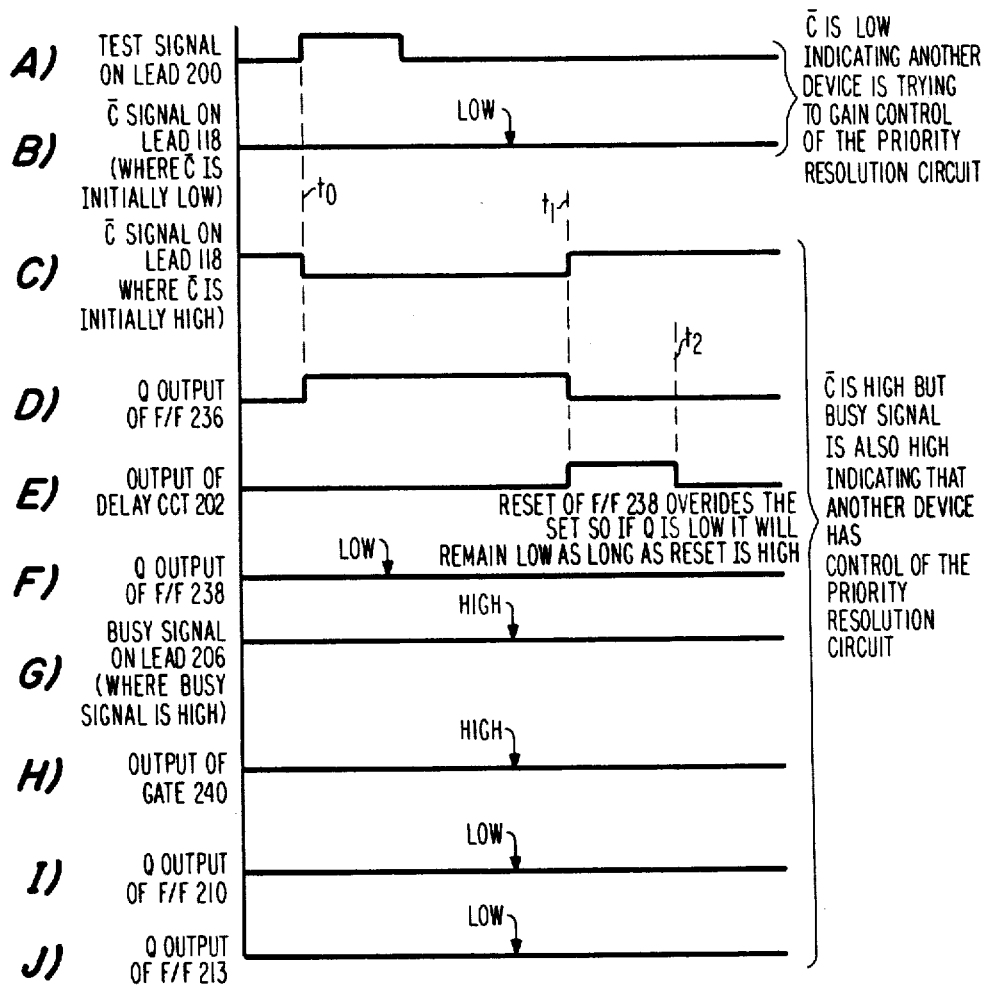
Figure 4:
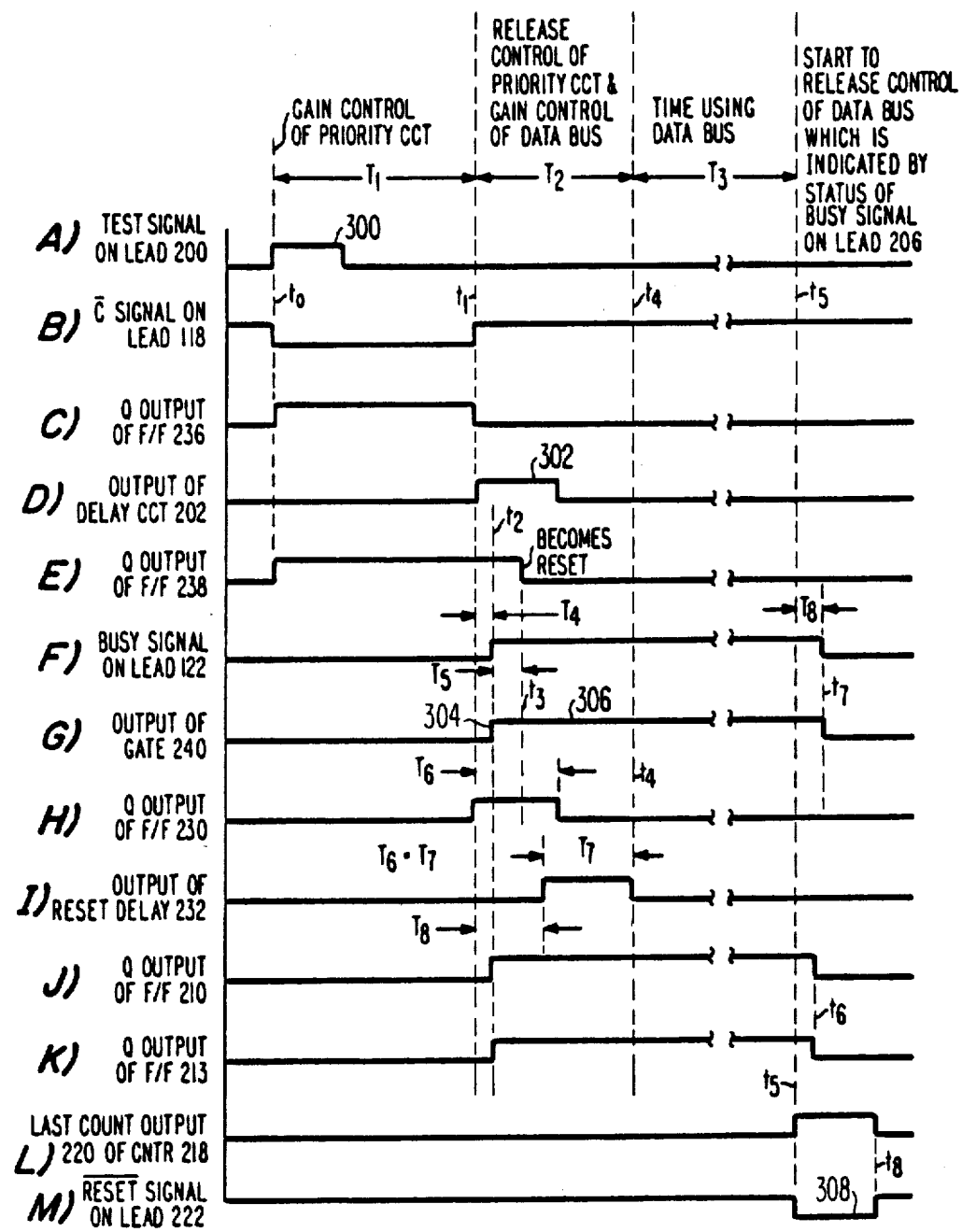

FIG. 3 is a set of timing waveforms showing the potential and relative timing of the block diagram of FIG. 2 for two instances where a device seeking control of the data bus fail to acquire such control; and FIG. 4 is a set of waveforms showing voltages and timing relationships of the block diagram of FIG. 2 in a third case, for instance, where the device seeking to acquire control of the data bus in fact successfully acquires such control.

Figure 1:
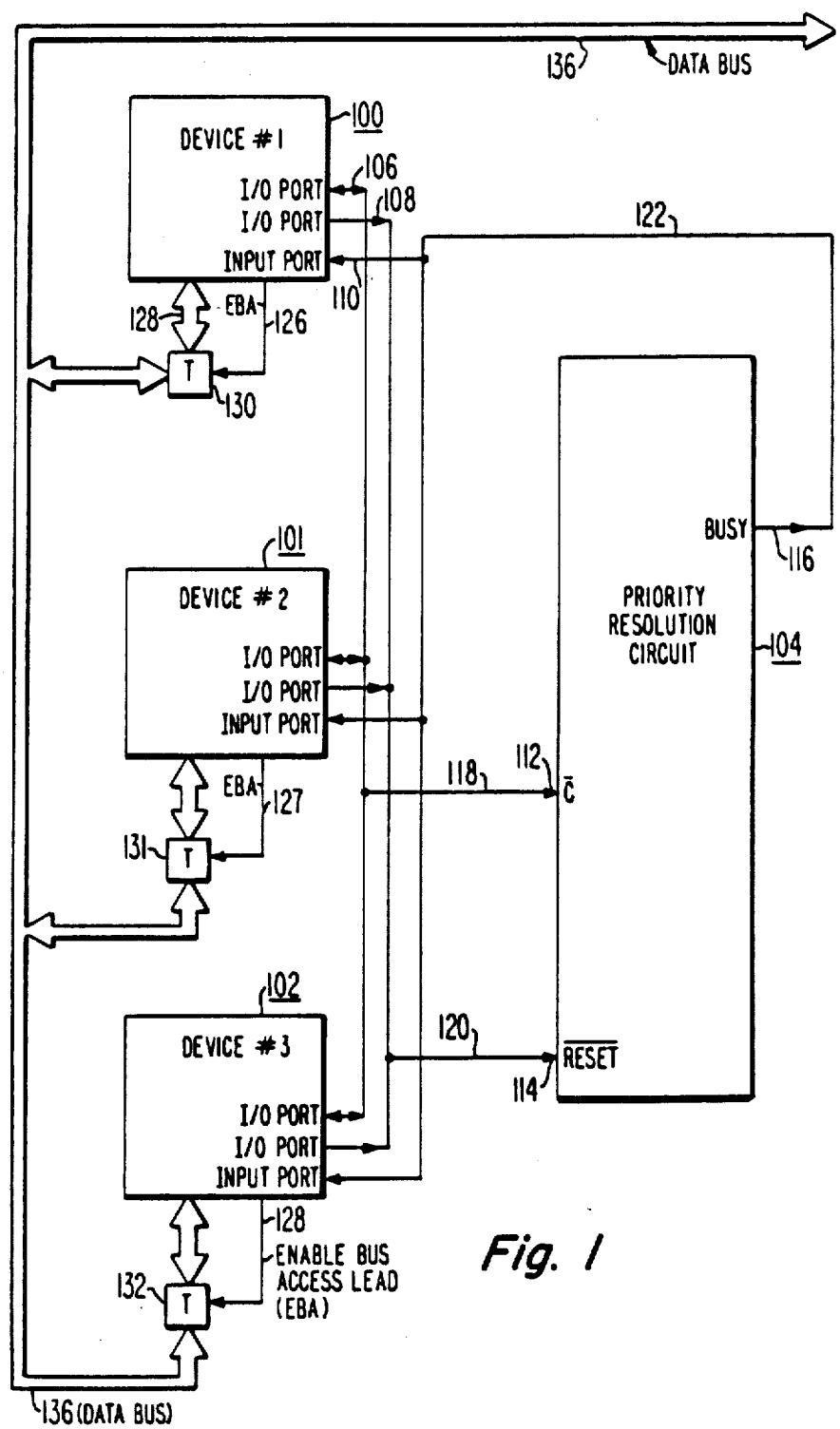
FIG. 1 is an overall block diagram of a multi-bus system employing a plurality of devices and the single priority resolution circuit (PRC) of the invention.

Referring now to FIG. 1 there are shown three devices 100, 101 and 102 all of which are connectable to the common data bus 136 through transmission gates 130, 131 and 132, respectively, when enabled by a high level signal on an enable bus access lead, such as enable bus access leads 126, 127 and 128.

The three devices 100, 101 and 102 also all employ the same priority resolution circuit (PRC) 104 via leads 122, 118 and 120. More specifically, the lead 120 is connected to reset input 114 of PRC 104 and to an I/O port of each of the devices 100–102 such as I/O port 108 of device 100. The lead 118 is connected at one end to $\overline{C}$ input 112 of PRC 104 and at the other end to the three devices 100–102 via I/O ports such as I/O port 106 of device 100. The lead 122 is connected at one end to output terminal 116 of PRC 104, which output terminal 116 indicates the busy status of the data bus 136 and at the other end to input port of devices 100, 101 and 102, such as input port 110 of device 100.

In the operation of the system of FIG. 1, assume that a given device has had control of the system of the data bus 136. When such given device has completed the transmission of its message, a reset pulse will be generated within the given device and supplied to reset input 114 via lead 120. This reset pulse will reset the PRC circuit in a manner to be described later in connection with the detailed logic diagram of FIG. 2 and prepare it for acquisition of the data bus 136 by another one of the devices 100–102. When a device such as device 100 desires to obtain control of the data bus, two major steps must be undertaken before acquisition of the data bus can be acquired. These two steps are as follows. The level of the signal present on the lead 118 ($\overline{C}$) must be tested. If this signal level is a low level signal that indicates some other device is making an attempt to acquire the data bus and that device 100 must wait some predetermined interval of time before attempting to again acquire access to the data bus. On the other hand, if the signal level $\overline{C}$ on lead 118 is high, device 100 can proceed with the second test since there is no conflict with another device as to this portion of the two step procedure for obtaining access to the data bus 136.

The second step involves a testing of the signal level on the busy signal lead 122 which is derived from busy terminal 116 of PRC circuit 104. If the signal level on lead 122 is high this indicates to the testing logic in device 100 that some other device is using, or has acquired access to the data bus, and device 100 must wait a predetermined time before again attempting to acquire access to the data bus 136, and then must again start the acquisition by checking the signal level of $\overline{C}$, as discussed above.

On the other hand, if the signal level on the busy signal lead 122 is low indicating that no other device is using the data bus, device 100 is free to acquire and use the data bus 136. The logic within device 100 will therefore stop driving line 118 to $\overline{C}$ input 112 to a low level, immediately causing the signal level on the busy signal terminal 116 to rise to a high level condition, and indicating to any other device that the data bus is now being used by some device (100) and not available for use by any other device for message transmission. At the end of the message transmission, device 100, assuming device 100 is the device having control of the data bus, will cause the busy signal level to go low by pulsing line 120 to $\overline{RESET}$ input 114 thereby indicating to other devices that the data bus is available to other devices assuming that the first part of the test, namely, the existence of a high level signal on $\overline{C}$ lead 118 is successful.

Referring now to FIG. 2, there is shown to the right of the dotted line 214 a logic diagram of the PRC circuit 104 of FIG. 1. To the left of and beneath the dotted line 214 is shown a portion of the logic within one of the devices which is obtaining control of the data bus line 136 (FIG. 1). Assume for purposes of continuity of discussion that the particular device in FIG. 2 attempting to obtain control of the data bus 136 of FIG. 1 is device 100.

In the discussion of FIG. 2, the two instances where device 100 first attempts unsuccessfully to gain control of the priority resolution circuit and then unsuccessfully attempts to gain control of the data bus 136 are shown in the waveforms of FIG. 3 which will be discussed first. Following a discussion of the two unsuccessful instances of acquisition of the data bus by device 100 there will be a discussion of a successful attempt to obtain control of the data bus, as shown in the waveforms of FIG. 4.

Consider now the case where some other device is already attempting to obtain control of the PRC. Therefore, assume the potential $\overline{C}$ on lead 118 (FIG. 2) is a low level signal. Thus, when device 100 tests the condition of line 118 by utilizing a high level signal on line 200, AND gate 201 will not become enabled since there is a low level signal being supplied to the input terminal 203 thereof. Accordingly, flip-flop 236, previously reset, will not be set and the Q output thereof will remain low.

Since the Q output of flip-flop 236 remains low, the set (S) input of flip-flop 238 will remain low and its Q output will also remain low. Thus, if flip-flop 210 is clocked by a pulse appearing on the busy signal lead 122, the Q output thereof will remain low from a prior reset condition, which will be discussed below in connection with the termination of a successful attempt to acquire the data bus 136 of FIG. 1.

Since the Q output of flip-flop 210 remains low, the Q output of flip-flop 213 will remain low so that the output on enable bus access lead 126 will remain low. It can be seen that if the level on the enable bus access lead 126 is low the transmission gate 130 of FIG. 1 remains disabled and the device 100 does not acquire use of data bus 136.

Consider next the second case where the attempt by the device 100 of FIG. 1 to acquire use of the data bus 136 of FIG. 1 passes the first test in that it finds that the voltage level of $\overline{C}$ of FIG. 2 is high so that AND gate 203 is enabled up to the time $t_0$ in FIG. 3C when it becomes disabled shortly thereafter. The Q output of flip-flop 236 goes high at time $t_0$ and stays high until time $t_1$ when it will be reset by the delayed test signal (waveform 3A) supplied to lead 200 and appearing at the output of delay circuit 202. Also at time $t_0$ the $\overline{C}$ signal will go to a low level since the signal on the Q output of flip-flop 236 will go to a high level thereby making transistor device 237 conductive and pulling lead 118 to ground potential (the low logic voltage level).

It will be assumed, however, that the second test, namely, the testing of the level of busy signal at the Q output of flip-flop 125 will fail in that such busy signal will be high, as indicated in waveform 3G. Such high level signal will pass through OR gate 240 to the reset input of flip-flop 238 to maintain the Q output of flip-flop 238 at a low level. The flip-flop 238 is constructed so that, if a high level signal is supplied to its reset input, the level of the Q output thereof will remain low even though a high level output is supplied to the set input of flip-flop 238.

Thus, the high level signal supplied from the Q output of flip-flop 236 to the set input of flip-flop 238 will have no effect on the signal level of the Q output of flip-flop 238 which remains at a low level. Such low level signal will be supplied to the D input of flip-flop 210 so that the Q output of flip-flop 210 will also remain at a low level which in turn maintain both the set input and the Q output 126 of flip-flop 213 at a low level.

As will be recalled from the description of the first case described above where the test for $\overline{C}$ failed, if the level on the enable bus access lead 126 is low, the transmission gate 130 of FIG. 1 remains disabled and device 100 cannot acquire the use of data bus 136 of FIG. 1.

Consider next the third case where the attempt by the device 100 of FIG. 1 to acquire use of the data bus 136 is successful. Such successful attempt is illustrated by waveforms of FIG. 4 as mentioned above. It will be recalled that in a successful attempt, device 100 will find the signal level of $\overline{C}$ on lead 118 of FIGS. 1 and 2 high and will pull the signal level low for a predetermined period of time $T_1 = t_1 - t_0$ during which time it will test the signal level on the busy signal on lead 122 of FIG. 2 and then return $\overline{C}$ to a high level. The device 100 will find the signal level of the busy signal low and will thereupon acquire use of data bus 136 of FIG. 1 and will transmit a message thereon. At the end of such message transmission (time $t_7$), device 100 will cause the level of the busy signal on lead 122 (FIG. 2) to return to a low level in preparation for an attempt at acquisition of the data bus by some other device.

Referring now specifically to the waveforms of FIG. 4, the test signal 300 of waveform 4A supplied to lead 200 of FIG. 2 will enable AND gate 201 since the $\overline{C}$ signal prior to time $t_0$ is a high level signal. The output of AND gate 201 will cause the Q output of flip-flop 236 to go high as shown in wavform 4C, thus rendering transistor 237 conductive, which pulls the signal level of $\overline{C}$ on lead 118 to a low level. Also the high Q output of flip-flop 236 sets flip-flop 238. The foregoing is all shown as occurring virtually simultaneously at time $t_0$ in waveforms 4A, 4B, 4C and 4E.

The test signal 300 of waveform 4A passes through a delay circuit 202 of FIG. 2 to appear at the reset input of flip-flop 236 at time $t_1$ as shown in waveform 4D. The rising leading edge of this delayed test signal 302 resets flip-flop 236 to cause the Q output of flip-flop 236 to go to its low level as shown at time $t_1$ in waveform 4C. With the Q output of flip-flop 236 at a low level, transistor 237 is rendered nonconductive and a negative-to-positive transition occurs on lead 118 as illustrated at time $t_1$ on waveform 4B.

The occurrence of the low value on the Q output of flip-flop 236 is supplied to the clock input of edge-triggered flip-flop 230 through inverter 234 to cause the Q output of flip-flop 230 to go high as shown in waveform 4H at time $t_1$.

The occurrence of the high level signal at the Q output of flip-flop 230 is delayed for a period of time $T_8$ as shown in waveform 4I for reasons that will be explained later herein. It will suffice for the present to say that each device has a reset delay time period to avoid the possibility of contention on the data bus.

The output of the reset delay 232 is then supplied through OR gate 240 to the reset input of flip-flop 238. However, when lead 118 transitioned from a low to a high at time $t_1$ (See waveform 4B), flip-flop 125 in the PRC was clocked and became set. There is a slight delay of duration $T_4 = t_2 - t_1$ (See waveform 4F), in the setting of flip-flop 125 so that the BUSY SIGNAL on lead 122 changes from a low to a high at time $t_2$. This is as indicated by negative-to-positive transition 304 (See waveform 4G). As is well known to those skilled in the logic design art, there is always a delay between the time when a signal appears at the input of an element and when the resulting signal appears at the output of an element. Normally the delay is inconsequential so that in timing diagrams no delay is illustrated. However, in some instances the delay is important to the logic circuit operation and is, therefore, illustrated. The delay of duration $T_4$ is one such delay and delay $T_5$, to be described below, is another such delay.

It is the high BUSY SIGNAL which causes the output of gate 240 to become high at time $t_2$, indicated by pulse 306 (See waveform 4G). A short time duration $T_5$ later (See waveform 4F) occasioned by the delay in flip-flop 238, flip-flop 238 actually becomes reset.

At time $t_2$ when the Q output of flip-flop 238 is still high, as shown in waveform 4E, the rising edge of the busy signal on lead 122 is supplied to the clock input of edge-triggered flip-flop 210 to cause the Q output thereof to become high as shown in waveform 4J at time $t_2$. The Q output of flip-flop 213 will respond to the high level Q output of flip-flop 210 to become a high level on its output 126 which is the enable bus access signal. This enable bus access signal as discussed above in connection with FIG. 1 enables transmission gate 130 of FIG. 1 to connect device 100 to data bus 136 of FIG. 1.

The message to be transmitted by the device 100 is then transmitted on the data bus as a series of bus cycles each of which might transmit a word of known length, for example. the total number of words to be transmitted is known and is equal to the count contained in counter 218 of FIG. 2. Assume that the number of words to be transmitted in a message is 64. Thus as the 64 words to be transmitted are in fact transmitted, the counter 218 will count from 64 down to zero; when it reaches the last count of zero a signal is supplied from the last count output 220 to several destinations. One of these destinations is through OR gate 240 to reset flip-flop 238. The next destination is to reset counter 218 back to the count of 64 and also to reset flip-flops 210 and 213 so that the Q outputs are low level in preparation for the next acquisition of the priority resolution logic by another device.

The last count output on lead 220 also functions to enable the transistor device 221 to provide a low level signal to one of the inputs of each of NAND gates 110 and 112. In the normal operation, the low level input to NAND gate 110 will produce a positive output from NAND gate 110 which will enable already primed NAND gate 108, since $\overline{C}$ is at a high level at this time, $t_7$, as shown in waveform 4B. Flip-flop 125 will thereupon become reset so that the Q output of flip-flop 125 will go to a low level in preparation for the acquisition of the PRC by another device.

At this time, $t_7$ of FIG. 4, the circuit has been completely reset and is ready for another attempt at acquisition of the data bus by one or more devices in the manner described above.

The purpose of the three NAND gates 110, 112 and 114 will now be considered. It is possible that at the time device 100 is completing its message transmission and is in the process of resetting the circuit of FIG. 2 in preparation for acquisition by another device and that another device 101 is already testing the $\overline{C}$ line 118 of FIG. 2 in an attempt to gain control of the priority resolution circuit. It will be recalled that device 100 returned the $\overline{C}$ to its high level at time $t_1$ in waveform 4B in its attempt to acquire control of the data bus 136 of FIG. 1.

However, since another device, which will be assumed to be device 101 of FIG. 1 is now attempting to gain control of the PRC circuit and has changed the $\overline{C}$ level to a low level signal, device 100 will be unable to complete its termination of its cycle of operation in that it will not be able to reset flip-flop 125 (FIG. 2) and return the busy signal on busy lead 122 to its low level.

The reason it will not be able to reset flip-flop 125 is that both inputs to NAND gate 108 are not high because $\overline{C}$ is now being pulled to a low level by device 101 (FIGS. 1 and 2) so that when the reset pulse occurs on lead 120 (FIGS. 1 and 2) due to the logic of device 100, the NAND gate 108 will not produce a low level output signal to reset flip-flop 125 (FIG. 2). Accordingly, additional circuitry in the form of the NAND gates 110, 112 and 114 are provided to remember that the reset signal on lead 120 (FIG. 2) did in fact occur.

More specifically, NAND gates 112 and 114 form a latch circuit in that when one of the two NAND gates 112 or 114 are enabled to produce a high level output signal the other NAND gate will produce a low level output signal. When the reset pulse 308 occurs on lead 120 as shown at time $t_5$ in waveform 4M, NAND gate 112 will produce a high level output signal to one of the two inputs of NAND gate 114. Since the busy signal is high at this time, the other input to NAND gate 114 will also be a high level and the output of NAND gate 114 will be a low level signal which will be supplied not only to one input of NAND 112 but also to one input of NAND gate 110. It is this low level input to NAND gate 110 and the condition of the latch 113 wherein NAND gate 114 is a low level signal that provides the memory function that a reset pulse has occurred on lead 120.

Thus, when device 101 proceeds in its attempt to gain control of the data bus (which will fail in this case since the BUSY signal has not yet been reset to a low level), it ultimately raises the $\overline{C}$ signal to a high level, and the output of NAND gate 108 will become a low level signal to reset flip-flop 125, thereby causing the Q output thereof to become a low level signal. This low level signal is supplied back via lead 122 to the logic of the devices 100 and 101 and to the NAND gate 114 of latch 113 of FIG. 2.

However, the only effect on the priority resolution circuit of the changing of the busy signal to a low level signal will be to cause NAND gate 114 to have a high level output and thereby change the state of the latch 113 so that the output of NAND gate 114 is a high level signal and the output of NAND 112 is a low level signal in preparation for acquisition of the system by another device.

While the above discussion covers those cases of possible contention where one device is attempting to obtain control of the data bus while another device is already attempting to obtain control of the data bus or is in fact using the data bus, there still remains one case where still another possible contention can occur. Such a case is where two devices such as device 100 and 101 of FIG. 1 both attempt virtually simultaneously to gain control of the data bus and both attempt to virtually simultaneously lower the signal level of $\overline{C}$ on lead 118 of FIG. 2.

It is apparent that if either device 100 or device 101 attempts to obtain control of the data bus at some small, predetermined time interval before the other device does there will be no contention between the two devices as to which one is attempting to obtain control of the data bus. Thus, contention will exist only when the attempt to test the condition of the signal level of $\overline{C}$ occurs virtually simultaneously by two devices, such as devices 100 and 101.

Assume, in this example, that device 101 will actually gain control of the data bus rather than device 100.

To solve this possible contention problem, the delay of delay circuit 202 of FIG. 2 for each device is different from any other device by a time interval greater than $\Delta t$. Assume, for purposes of example, that time interval delay of device 101 corresponding to delay circuit 202 of FIG. 2 is greater than the delay 202 of device 100 by $\Delta t$.

If device 100 has a shorter delay time in delay circuit 202 by amount $\Delta t$ than does device 101, device 101 will in fact acquire both the priority resolution circuit and the data bus if both device 100 and device 101 simultaneously begin to test the signal level of $\overline{C}$ of lead 118.

The giving of the priority to device 101 occurs as follows. Both devices 100 and 101 will cause the signal level of $\overline{C}$ to go low as shown at time $t_0$ in waveform 4B. However, after flip-flop 236 of device 100 is reset by the output of delay circuit 202 to disable transistor 237, the Q output of the corresponding flip-flop of device 101 (not shown in FIG. 2) remains high for a time period $\Delta t$ and holds the value of $\overline{C}$ low for this additional time period $\Delta t$, thus delaying the changing of the level of the busy signal on lead 122 at the Q output of flip-flop 125 from a low to a high level by the time period $\Delta t$.

The transition of the busy signal on lead 122 from a low to a high level will not have occurred in time to transfer the high level output of flip-flop 238 in device 100 to the Q output of flip-flop 210 for the following reason. Before the busy signal on lead 122 goes to a high level as a result of device 101 releasing $\overline{C}$ to a high level, the logic consisting of flip-flop 230 and reset delay 232 in device 100 will respond to the low level transition of the Q output of flip-flop 236 to supply a reset signal through OR gate 240 to reset flip-flop 238 and thereby cause the Q output of flip-flop 238 to assume a low level. Thus, when the busy signal on lead 122 goes to a high level as a result of the action of device 101, the level of the Q output of flip-flop 238 will then be a low level which will be transferred to the Q output of flip-flop 210 of device 100 so that device 100 will be disqualified from its attempt to acquire the data bus.

The operation of the logic including flip-flop 230 and reset delay 232 is straightforward. When the Q output of flip-flop 236 goes low the transition is inverted by inverter 234 to clock flip-flop 230 so that the Q output thereof goes high. The reset delay 232 delays the Q output of flip-flop 230 a short interval of time less than $\Delta t$ and then functions to reset flip-flop 230 and also to reset flip-flop 238 through OR gate 240, as described above. It will be noted that without the reset delay 232 and the flip-flop 230 the flip-flop 238 would not become reset until the busy signal went high so that the contention between devices 100 and 101 would occur.

It should be noted that the method described herein for resolving priority in granting control of a data bus works for any number of devices having delay circuits with the difference in delay from one to the next being $\Delta t$. The device with the highest priority should be assigned the longest delay. The reset delay of all the devices can be the same, being less than $\Delta t$ but greater than the delay existing from the $\overline{C}$ (line 118) to the BUSY (line 122) which is inherent in the priority resolution circuit.

I claim:

1. In a system comprising a plurality of devices none, one, some or all of which may be contending for use of a common data bus, a priority resolution circuit for determining which particular device of said plurality of devices shall obtain control of the common data bus, comprising:

first logic means common to all of said devices, comprising:

a first common control bus having one level signal thereon when none of said devices is attempting to obtain control of the common data bus and another level signal thereon when any one or ones of said devices is/are attempting to obtain control of said common data bus; and a second common control bus having one level signal thereon when none of said devices has control of said common data bus and another level signal thereon when one of said devices has control of said common data bus;

each of said devices including said particular device comprising second logic means for testing the signal level on said first common control bus and responsive to said one level signal on said first common control bus to then test the signal level on said second common control bus;

the said second logic means of said particular device being further responsive to said another level signal on said second common control bus to obtain control of said common data bus.

2. A system as in claim 1 in which said second logic means of said particular device is further responsive to said level signal on said first common control bus to change the signal level thereon to said second level for a first, short predetermined time interval and responsive to said one level signal on said second common control bus to change the signal level thereon to said another level signal for a time interval extending from the expiration of said first predetermined time interval until said particular device no longer needs control of said common data bus at which time the signal level on said second control bus is changed from said another level to said one level.

3. A system as in claim 2 in which the second logic means of each device will produce a first predetermined time delay which is of a duration different from the first predetermined time delay of any other device.

4. In a system comprising a plurality of devices none, one, some or all of which may be contending for use of a common data bus, a priority resolution circuit for determining which particular device of said plurality of devices shall obtain control of the common data bus comprising:

first logic means common to all of said devices and comprising:
a first common control bus having one level signal thereon when none of said devices is attempting to obtain control of the common data bus and another level signal thereon when any one or more of said devices is attempting to obtain control of said common data bus; and
a second common control bus having one level signal thereon when none of said devices has control of said common data bus and another level signal thereon when any of said devices has control of said common data bus;
each of said devices comprising logic means for successively testing said first common control bus for said one high level signal and then said second common control bus for said one level signal to determine if any other device is attempting to obtain control of said common data bus;
said logic means further responsive to successful tests of said one level signal on said first common control bus and said one level signal on said second common control bus to obtain control of said common data bus,
said loic means further responsive to said one level signal on said first common control bus to change the signal level thereon to said another level for a first, short predetermined time interval and responsive to said first level signal on said second common control bus to change the signal level thereon to said another level signal for a second predetermined time interval beginning with the expiration of said first predetermined time interval;
said logic means being further responsive to the termination of use of said common data bus by said given device to change the signal level on said second control bus from a high level to a low level.

5. In a system comprising a plurality of devices all using a common data bus and common priority resolution circuit having a first common control bus which has a first level signal thereon when none of said devices is attempting to obtain control of the common data bus and a second level signal thereon when any or ones of said devices is/are attempting to obtain control of said common data bus, and a second common control bus having a third level signal thereon when none of said devices has control of said common data bus and a fourth level signal thereon when any one of said devices has control of said common data bus; a method of determining which particular device of said plurality of devices shall have control of the common data bus, comprising the following steps taken by said particular device:

determining the signal level on said first common control bus;
responding to said first level signal on said first common control bus to then test the signal level on said second common control bus; and
taking control of said common data bus if the signal level on said second common control bus is said third level.

6. A method as in claim 5 and further comprising the steps of:
(a.) changing the signal level on said first common control bus from said first level to said second level for a predetermined time interval when it is determined that the signal level on said first common control bus is said first level and then changing the signal level on said first common control bus back to said first level at the end of said predetermined time interval;
(b.) changing the level of the signal on said second common control bus from said third level to said fourth level for the given time period said particular device has control of said common data bus; and
(c.) changing the level of the signal on said second common control bus from said fourth level to said third level at the end of said given time period said particular device has control of said common bus.

7. A method as in claim 6 in which step (a) further comprises the step of changing the signal level on said first common control bus, for each device, from said first level to said second level for a predetermined time interval which is different from the corresponding predetermined time interval of any other device.

8. In a system comprising a plurality of devices all using a common data bus, a priority resolution circuit for determining the particular device of said plurality of devices which shall obtain control of the common data bus when one or more of said devices other than said particular device is/are attempting to obtain control of said common data bus, comprising:

first logic means common to all of said devices, comprising:
a first control bus common to all of said devices and having a first signal level thereon when none of said devices is attempting to obtain control of said common data bus and having a second signal level thereon when any one or ones of said devices is/are attempting to obtain control of said common data bus; and
a second control bus common to all of said devices and having a third signal level thereon when none of said devices has control of said common data bus and a fourth signal level thereon when any of said devices has control of said common data bus;
each of said devices, including said particular device, comprising second logic means for testing the signal level on said first common control bus and responsive to said first signal level on said first common control bus to then test the signal level on said second common control bus;
said second logic means of said particular device being further responsive to said third signal level on said second common control bus to obtain control of said common data bus.

* * * * *

UNITED STATES PATENT AND TRADEMARK OFFICE
CERTIFICATE OF CORRECTION

PATENT NO. : 4,639,859

DATED : Jan. 27, 1987

INVENTOR(S) : Russell G. Ott

It is certified that error appears in the above-identified patent and that said Letters Patent is hereby corrected as shown below:

Col. 3, line 19, after "bus" delete - - - line - - -.

Col. 9, line 34, change "loic" to - - - logic - - -.

Signed and Sealed this

Twenty-sixth Day of November, 1991

Attest:

HARRY F. MANBECK, JR.

*Attesting Officer*     *Commissioner of Patents and Trademarks*